(12) United States Patent
Ikeda et al.

(10) Patent No.: US 9,232,147 B2
(45) Date of Patent: Jan. 5, 2016

(54) IMAGE PICKUP APPARATUS AND IMAGE PICKUP METHOD

(71) Applicant: Olympus Imaging Corp., Shibuya-ku, Tokyo (JP)

(72) Inventors: Makoto Ikeda, Kunitachi (JP); Kazuhiro Haneda, Hachioji (JP); Yoshinao Shimada, Hino (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/093,308

(22) Filed: Nov. 29, 2013

(65) Prior Publication Data

US 2014/0085512 A1     Mar. 27, 2014

Related U.S. Application Data

(63) Continuation of application No. PCT/JP2012/054446, filed on Feb. 23, 2012.

(30) Foreign Application Priority Data

May 31, 2011   (JP) .................................. 2011-122342

(51) Int. Cl.
*H04N 5/232* (2006.01)
*H04N 5/343* (2011.01)
*H04N 5/374* (2011.01)
*H04N 5/345* (2011.01)

(52) U.S. Cl.
CPC ........... *H04N 5/23296* (2013.01); *H04N 5/343* (2013.01); *H04N 5/3454* (2013.01); *H04N 5/374* (2013.01)

(58) Field of Classification Search
CPC . H04N 5/23296; H04N 5/343; H04N 5/3454; H04N 5/374

USPC ........................................................... 348/294
See application file for complete search history.

(56) References Cited

U.S. PATENT DOCUMENTS 6,839,452 B1 * 1/2005 Yang ....................... H03F 3/082
                                                              348/E3.02
6,903,772 B1   6/2005 Shinohara
(Continued)

FOREIGN PATENT DOCUMENTS

EP       0 942 594        9/1999
JP       11-055571        2/1999
(Continued)

OTHER PUBLICATIONS

International Search Report for International Application No. PCT/JP2012/054446, dated Apr. 3, 2012, with translation (4 pgs.).

*Primary Examiner* — Pritham Prabhakher
(74) *Attorney, Agent, or Firm* — John C. Pokotylo; Straub & Pokotylo

(57) ABSTRACT

An image pickup apparatus including an image pickup device having a pixel section with a plurality of two-dimensionally arranged pixels and a frame memory which temporarily stores, in an analog manner, analog image data read out from the pixel section and first to third readout control sections which perform first readout control that reads out image data of all pixels obtained through one exposure from the pixel section and stores the image data in the frame memory and perform second readout control that nondestructively reads out a piece of image data of a smaller number of pixels than all the pixels from the image data of all the pixels stored in the frame memory a plurality of times such that the piece of image data each has different object region size.

5 Claims, 14 Drawing Sheets

(56) References Cited

U.S. PATENT DOCUMENTS

| | | | |
|---|---|---|---|
| 8,648,934 B2* | 2/2014 | Takahashi | H04N 5/23229 348/231.99 |
| 2002/0018600 A1* | 2/2002 | Lyon | H04N 3/1562 382/305 |
| 2004/0141067 A1* | 7/2004 | Nakayama | H04N 1/0411 348/222.1 |
| 2009/0160947 A1* | 6/2009 | Shigeta | H04N 5/3454 348/207.99 |
| 2011/0285894 A1* | 11/2011 | Shiohara | G09G 5/12 348/333.01 |

FOREIGN PATENT DOCUMENTS

| | | |
|---|---|---|
| JP | 11-261894 | 9/1999 |
| JP | 2010-183337 | 8/2010 |
| JP | 2010-226496 | 10/2010 |
| JP | 2010-258904 | 11/2010 |

\* cited by examiner

IMAGE PICKUP APPARATUS AND IMAGE PICKUP METHOD

CROSS REFERENCE TO RELATED APPLICATION

This application is a continuation application of PCT/JP2012/054446 filed on Feb. 23, 2012 and claims benefit of Japanese Application No. 2011-122342 filed in Japan on May 31, 2011, the entire contents of which are incorporated herein by this reference.

BACKGROUND OF THE INVENTION

1. Field of the Invention

The present invention relates to an image pickup apparatus and an image pickup method for reading out a plurality of pieces of image data having different object region sizes.

2. Description of the Related Art

Live view (LV) that is intended to observe an object, a still image of which is desired to be shot, by displaying in real time a movie being shot by an image pickup device on a display apparatus, such as a liquid crystal display, is prevalent among electronic image pickup apparatuses, such as a digital camera. When live view is in operation, a whole of an image formed on an image pickup device needs to be displayed in order to check composition. Aside from the need, there is also demand to display a precise enlarged image of a principal section in order to check the degree of focusing on a main object.

For example, Japanese Patent Application Laid-Open Publication No. 2010-226496 discloses a technique for displaying a sub-screen for a principal section enlarged image in a display screen for a whole image such that the sub-screen does not overlap with a focus AF region to avoid, e.g., a situation in which the sub-screen overlaps with a main object in the whole image.

Various techniques are proposed as examples of a technique for obtaining such a plurality of pieces of image data having different object region sizes at a frame rate suitable for LV.

An example is a technique for obtaining images having a plurality of object region sizes by changing a driving mode of an image pickup device, as shown in FIG. 13. FIG. 13 is a timing chart showing a first conventional technique which changes a driving mode of an image pickup device at constant intervals.

In the technique, a full-region LV mode of reading out an image for LV of a whole of an object region and an enlarged LV mode of enlarging only a principal section of the object region and reading out an image of the principal section as an image for LV are alternately repeated at constant intervals (intervals which are an integral multiple of a period (e.g., 16.6 ms (corresponding to 60 fps)) of a vertical synchronizing signal VD).

Another example is a technique for reading out all pixels on an image pickup device at high speed (read out at 30 fps in the shown example), converting the pixels into digital data, storing the digital data in a digital memory, and generating images having a plurality of object region sizes, as shown in FIG. 14. FIG. 14 is a timing chart showing a second conventional technique which reads out all pixels at high speed.

An image of all pixels stored in a digital memory can be used to display a whole image if the image is converted into an image for display by pixel number conversion. Additionally, an enlarged image can be obtained by extracting a desired region from the image of all the pixels stored in the digital memory and subjecting the region to pixel number conversion. Since an enlarged image is created on the basis of image data of all pixels outputted from the image pickup device in the technique, an enlarged image is not outputted from the image pickup device itself separately from a whole image.

For application of the technique as described with reference to FIG. 14, all pixels need to be read out at high speed (a higher data rate is necessary). To the end, control over driving of an image pickup device at a high frequency, readout through a plurality of channels, A/D conversion at a high frequency through a plurality of channels, and the like are necessary.

SUMMARY OF THE INVENTION

An image pickup apparatus according to an aspect of the present invention includes an image pickup device having a pixel section with a plurality of two-dimensionally arranged pixels and a frame memory which temporarily stores, in an analog manner, analog image data read out from the pixel section and a readout control section which performs first readout control that reads out image data of all pixels obtained through one exposure from the pixel section and stores the image data in the frame memory and performs second readout control that nondestructively reads out a piece of image data of a smaller number of pixels than all the pixels from the image data of all the pixels stored in the frame memory a plurality of times such that the piece of image data each has different object region size.

An image pickup method according to another aspect of the present invention is an image pickup method for reading out image data from an image pickup device having a pixel section with a plurality of two-dimensionally arranged pixels and a frame memory which temporarily stores, in an analog manner, analog image data read out from the pixel section, and includes first readout that reads out image data of all pixels obtained through one exposure from the pixel section and stores the image data in the frame memory, and second readout that nondestructively reads out a piece of image data of a smaller number of pixels than all the pixels from the image data of all the pixels stored in the frame memory a plurality of times such that the piece of image data each has different object region size.

DETAILED DESCRIPTION OF THE PREFERRED EMBODIMENTS

Embodiments of the present invention will be described below with reference to the drawings.

First Embodiment

Figure 1:
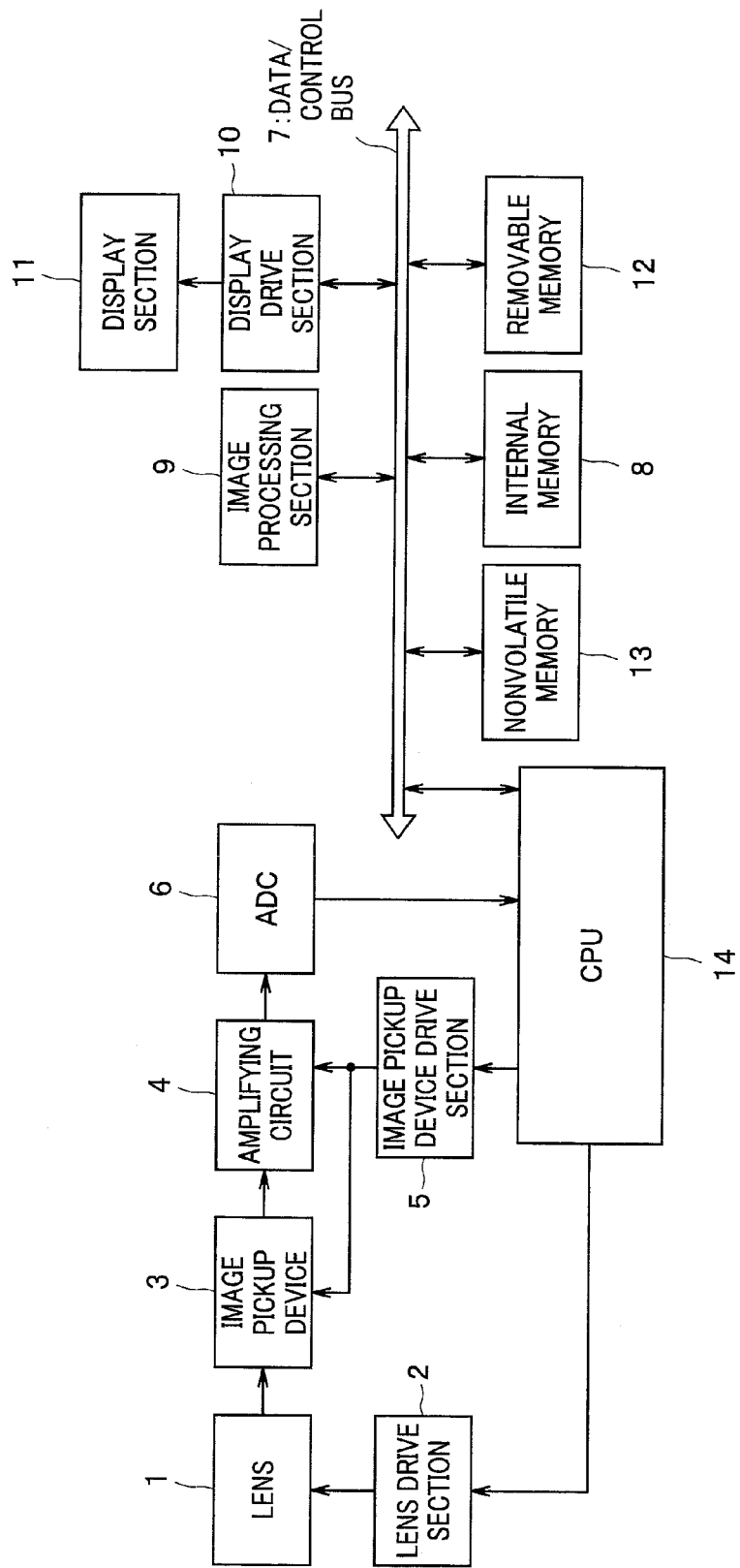
FIG. 1 is a block diagram showing a configuration of an image pickup apparatus according to a first embodiment of the present invention.

FIGS. 1 to 11 show a first embodiment of the present invention. FIG. 1 is a block diagram showing a configuration of an image pickup apparatus.

The image pickup apparatus is configured as, for example, a digital camera and includes a lens 1, a lens drive section 2, an image pickup device 3, an amplifying circuit 4, an image pickup device drive section 5, an ADC (analog to digital converter: A/D converter) 6, a data/control bus 7, an internal memory 8, an image processing section 9, a display drive section 10, a display section 11, a removable memory 12, a nonvolatile memory 13, and a CPU 14.

The lens 1 is a shooting optical system for forming an optical image of an object on an image pickup surface of the image pickup device 3 and includes a focusing lens for adjusting a focus position and an iris mechanism for adjusting brightness of an optical image.

The lens drive section 2 is intended to control the focusing lens of the lens 1 and the iris mechanism under control of the CPU 14.

The image pickup device 3 is intended to photoelectrically convert an optical image of an object which is formed by the lens 1 and generate and output electrical analog image signals.

The image pickup device drive section 5 is intended to output a timing signal for driving the image pickup device 3 under control of the CPU 14. Readout of an image signal from the image pickup device 3 is performed by the image pickup device drive section 5 under control of the CPU 14.

The amplifying circuit 4 is intended to amplify an analog signal outputted from the image pickup device 3.

The ADC 6 is intended to convert an analog signal into digital data. An output side of the ADC 6 is connected to the data/control bus 7 via the CPU 14. The digital data outputted from the ADC 6 is thus outputted to, e.g., the internal memory 8 and other individual circuits via the CPU 14 and the data/control bus 7.

The CPU 14 is connected to the data/control bus 7. Besides the CPU 14, the internal memory 8, the image processing section 9, the display drive section 10, the removable memory 12, and the nonvolatile memory 13 are bi-directionally connected to the data/control bus 7. The data/control bus 7 is intended to deliver/receive a control signal and various types of data to/from the components.

The internal memory 8 is, for example, a volatile storage medium which is used to store an image signal converted into digital data by the ADC 6 or an image signal processed by the image processing section 9 and is also used as a memory for the CPU 14 to perform processing.

The image processing section 9 is intended to subject an image signal stored in the internal memory 8 to various types of digital signal processing and store the image signal having undergone the processing again in the internal memory 8.

The display drive section 10 is intended to drive the display section 11 to display an image.

The display section 11 is intended to display a live view image (a movie being shot in real time) shot by the image pickup device 3 and display an image obtained through still image shooting for checking after the shooting by being driven by the display drive section 10. When live view is in operation, the display section 11 functions as an image display section which displays a plurality of pieces of image data having different object region sizes that are read out from the image pickup device 3 under control of a readout control section (to be described later).

The removable memory 12 is a recording medium for recording, in a nonvolatile manner, an image signal which is processed for recording by the image processing section 9. The removable memory 12 is configured as, for example, a memory card so as to be removable from the image pickup apparatus. The removable memory 12 may thus not be configured to be specific to the image pickup apparatus.

The nonvolatile memory 13 is a recording medium which stores various types of processing programs to be executed by the CPU 14, various types of data required to execute the processing programs, and the like.

The CPU 14 is intended to control operation of a whole of the image pickup apparatus. For example, the CPU 14 calculates an AF evaluation value and an AE evaluation value on the basis of an image signal outputted from the ADC 6 and controls the lens drive section 2 on the basis of a result of the calculation to drive the lens 1. The CPU 14 is also intended to control operation (e.g., still image shooting operation and live view shooting operation) of the image pickup device 3 via the image pickup device drive section 5.

Figure 2:
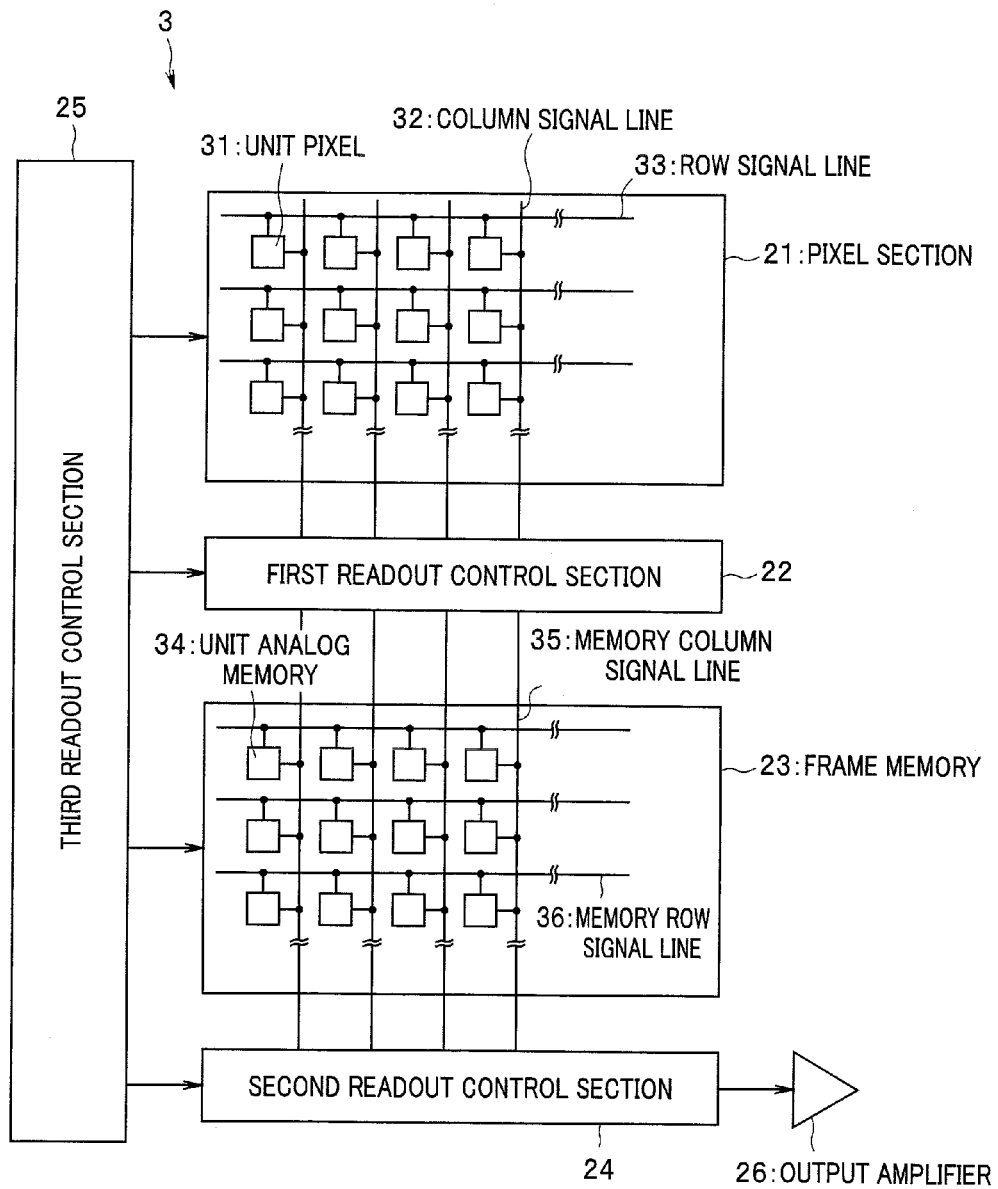
FIG. 2 is a diagram showing a configuration of an image pickup device according to the first embodiment.

FIG. 2 is a diagram showing a configuration of the image pickup device 3.

As shown in FIG. 2, the image pickup device 3 includes a pixel section 21, a first readout control section 22, a frame memory 23, a second readout control section 24, a third readout control section 25, and an output amplifier 26.

The pixel section 21 is composed of a plurality of pixels (unit pixels 31 shown in FIG. 2) two-dimensionally arranged in a row direction and in a column direction. Each unit pixel 31 is configured to include a photodiode (PD) which accumulates electric charge corresponding to the amount of light received, a floating diffusion (FD), and a plurality of transistors (a reset transistor, a readout transistor, an amplifying transistor, a row selection transistor, and the like). In the pixel section 21, column signal lines 32 are connected to respective lines of unit pixels 31 in the column direction while row signal lines 33 are connected to respective lines of unit pixels 31 in the row direction. The individual column signal lines 32 are connected to the first readout control section 22, and the individual row signal lines 33 are connected to the third readout control section 25.

The first readout control section 22 is intended to perform first readout control that reads out image data of all pixels obtained through one exposure from the pixel section 21 and stores the image data in the frame memory 23 under control of the third readout control section 25. In the first readout control, simultaneous readout from the pixel section 21 to the frame memory 23 is performed on a plurality of pixels in one operation and in parallel by using the plurality of column signal lines 32. The first readout control allows high-speed transfer from the pixel section 21 to the frame memory 23 and, by extension, high-speed shuttering in a device shutter. The first readout control section 22 is configured to include a vertical signal amplifying circuit which amplifies, in an analog manner, an analog signal read out from each column signal line 32, a CDS circuit which performs correlated double sampling, and an analog memory write control section which performs control over writing to the frame memory 23 in a vertical direction.

The frame memory 23 is composed of a plurality of respective unit analog memories 34, corresponding to the plurality of unit pixels 31 provided at the pixel section 21, two-dimensionally arranged in a row direction and in a column direction. The frame memory 23 is intended to temporarily store, in an analog manner, analog image data read out from the pixel section 21. In the frame memory 23, memory column signal lines 35 are connected to respective lines of unit analog memories 34 in the column direction while memory row signal lines 36 are connected to respective lines of unit analog memories 34 in the row direction. The individual memory column signal lines 35 are connected to the first readout control section 22 and the second readout control section 24, and the individual memory row signal lines 36 are connected to the third readout control section 25.

The second readout control section 24 is intended to perform control that reads out image data stored in the frame memory 23 under control of the third readout control section 25. The second readout control section 24 and the third readout control section 25 perform second readout control that nondestructively reads out a piece of image data of a smaller number of pixels than all pixels from image data of all the pixels stored in the frame memory 23 a plurality of times such that the pieces of image data have different object region sizes, especially at the time of live view shooting operation. As will be described later, a plurality of pieces of image data having different object region sizes in the second readout control include, for example, a piece of whole image data having an object region identical to an object region of the image data composed of all the pixels and a piece of enlarged image data having an object region smaller than the object region of the image data composed of all the pixels. In the nondestructive readout of the second readout control, at least one of pixel addition readout and pixel skipping readout and extraction readout are performed. At least one of pixel addition readout and pixel skipping readout is performed when a piece of whole image data is read out, and at least extraction readout is performed when a piece of enlarged image data is read out. As a result, a piece of enlarged image data is larger in the number of pixels constituting an identical object portion than a piece of whole image data. That is, the piece of enlarged image data allows higher-definition display of the identical object portion.

The third readout control section 25 is intended to generate vertical scanning signals (e.g., a vertical SR scanning signal, a pixel readout signal, a pixel reset signal, and a row selection signal) for the pixel section 21, generate controls signals (e.g., a vertical signal amplifying circuit control signal, and an S/H circuit (sample hold circuit) control signal) for controlling the first readout control section 22, generate control signals (e.g., a memory row selection signal, a memory write signal, and a memory read signal) for controlling the frame memory 23, and generate control signals (e.g., a horizontal SR scanning signal, and a column skipping (addition) signal) for controlling the second readout control section 24.

The first to third readout control sections 22, 24, and 25 inside the image pickup device 3 correspond to the readout control section. In a broader sense, the image pickup device drive section 5, the CPU 14, and the like may also correspond to the readout control section.

The output amplifier 26 is intended to amplify, in an analog manner, an analog image signal read out from the second readout control section 24 and output the amplified analog image signal.

Figure 3:
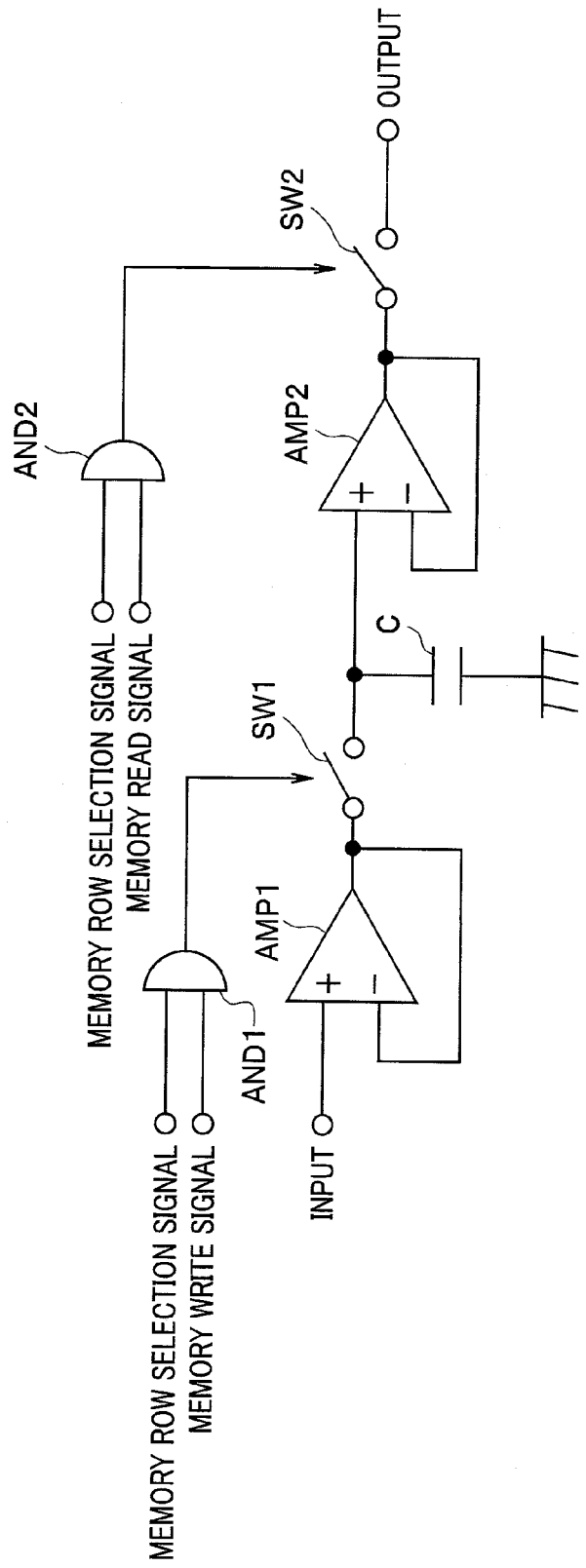
FIG. 3 is a circuit diagram showing a configuration example of a unit analog memory according to the first embodiment.

FIG. 3 is a circuit diagram showing a configuration example of the unit analog memory 34.

In the example shown in FIG. 3, the unit analog memory 34 includes a first OP amplifier AMP1, a first switch SW1, a first AND circuit AND1, a capacitor C, a second OP amplifier AMP2, a second switch SW2, and a second AND circuit AND2 and constitutes a sample hold circuit.

A pixel signal read out via the first readout control section 22 is inputted to a noninverting input end of the first OP amplifier AMP1. An output end of the first OP amplifier AMP1 is connected to an inverting input end of the first OP amplifier AMP1 and is also connected to a one-end side of the first switch SW1.

The first switch SW1 is controlled so as to be on/off by an output from the first AND circuit AND1. A memory row selection signal and a memory write signal are inputted to the first AND circuit AND1.

One end of the other-end side of the first switch SW1 is connected to the capacitor C that is grounded, and the other-end side is also connected to a noninverting input end of the second OP amplifier AMP2. An output end of the second OP amplifier AMP2 is connected to an inverting input end of the second OP amplifier AMP2 and is also connected to a one-end side of the second switch SW2.

The second switch SW2 is controlled so as to be on/off by an output from the second AND circuit AND2. A memory row selection signal and a memory read signal are inputted to the second AND circuit AND2.

With the above-described configuration, a voltage of a pixel signal read out from the unit pixel 31 is held in the capacitor C when the first switch SW1 is turned on. When the first switch SW1 is changed to off, the voltage is kept held in the capacitor C. When the second switch SW2 is then turned on, the voltage of the pixel signal held in the capacitor C is nondestructively read out (the voltage can thus be repetitively read out).

Figure 4:
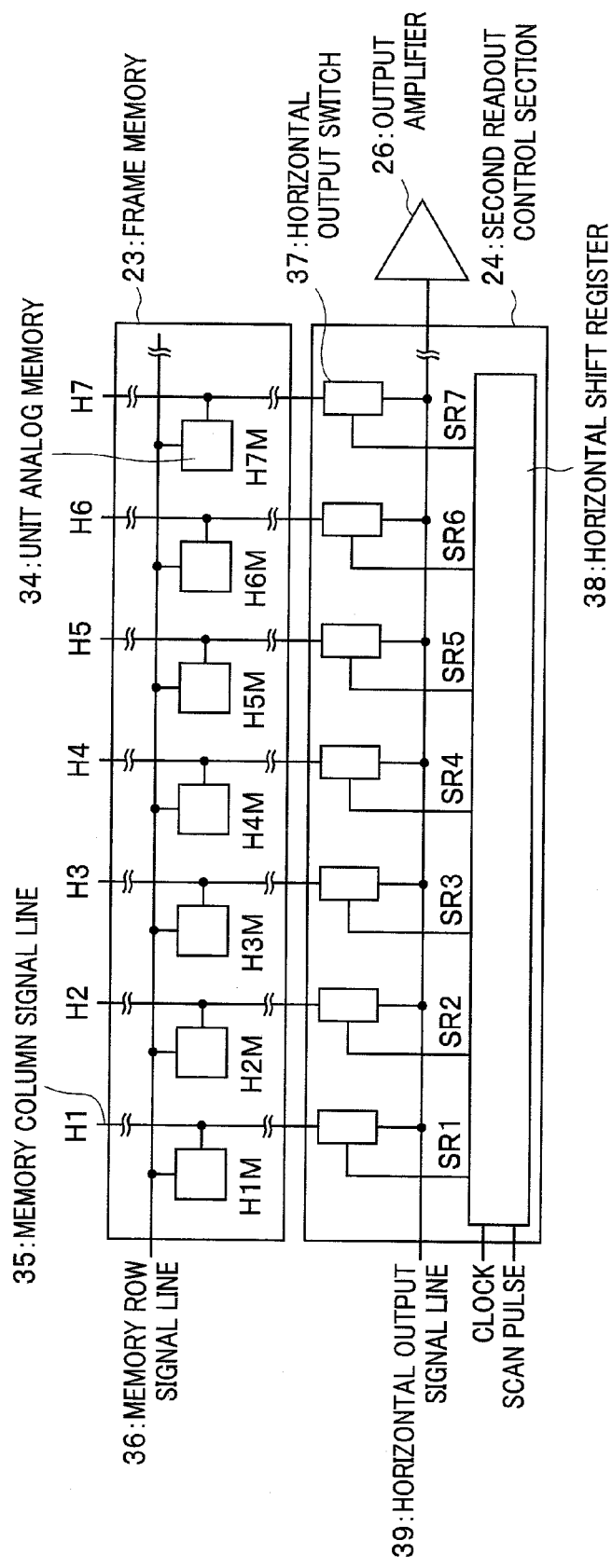
FIG. 4 is a diagram showing an example of a configuration of a frame memory and a second readout control section which are associated with horizontal pixel addition, according to the first embodiment.
Figure 5:
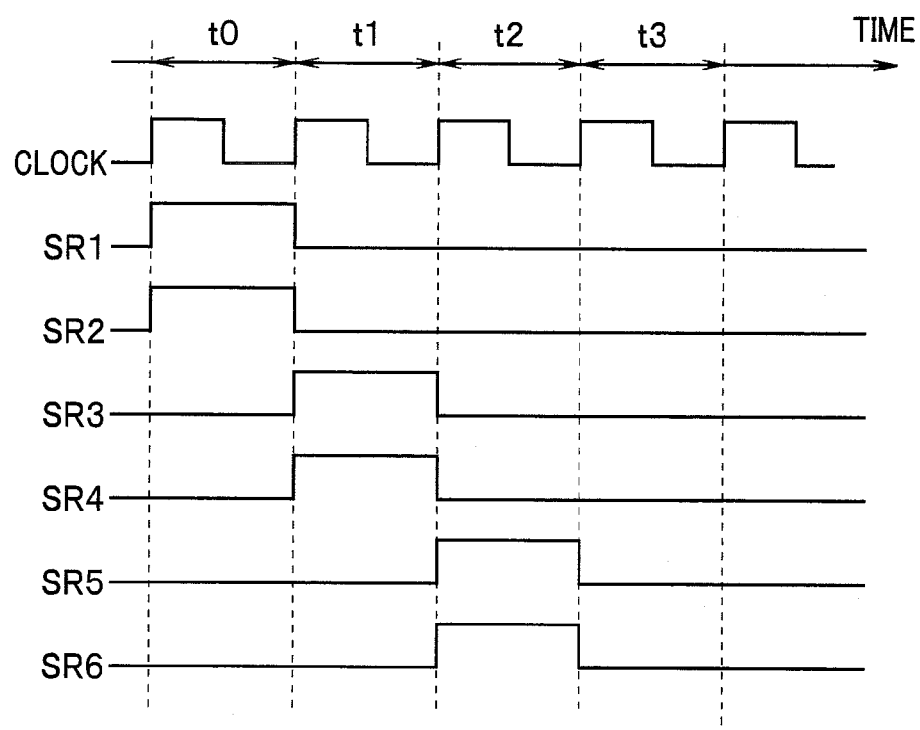
FIG. 5 is a timing chart showing an example of SR scan pulses to be given to the circuit in FIG. 4, according to the first embodiment.

FIG. 4 is a diagram showing an example of a configuration of the frame memory 23 and the second readout control section 24 that are associated with horizontal pixel addition. FIG. 5 is a timing chart showing an example of SR scan pulses to be given to the circuit in FIG. 4.

Respective pixel signals held in the unit analog memories 34 that are placed in a certain row in the frame memory 23 and are denoted by reference characters H1M, ..., H7M, ... are read out to the second readout control section 24 via the memory column signal lines 35 that are denoted by reference characters H1, ..., H7, .... The readout is performed by applying a memory row selection signal and a memory read signal to the second AND circuit AND2 shown in FIG. 3 via the memory row signal line 36.

The second readout control section 24 includes a plurality of horizontal output switches 37 which are connected to the memory column signal lines 35 denoted by reference characters H1, ..., H7, ..., respectively. The plurality of horizontal output switches 37 are connected to the output amplifier 26 described above via a horizontal output signal line 39 and are also connected to a horizontal shift register 38.

In the horizontal shift register 38, shift registers corresponding to the horizontal output switches 37 connected to the memory column signal lines 35 denoted by reference characters H1, ..., H7, ... are denoted by reference characters SR1, ..., SR7, ....

A clock signal and an SR scan pulse are applied to the horizontal shift register 38. For example, when horizontal 2-pixel addition is performed, a clock signal and SR scan pulses to the shift registers SR1, ..., as shown in FIG. 5, are applied to the horizontal shift register 38.

That is, application of signals at high level only to the shift registers SR1 and SR2 at a time during a period t0 in FIG. 5 causes the output amplifier 26 to amplify and output a signal obtained by averaging pixel signals held in the unit analog memories 34 denoted by reference characters H1M and H2M (i.e., a signal obtained through pixel mixture).

Similarly, application of signals at high level only to the shift registers SR3 and SR4 at a time during a period t1 in FIG. 5 causes the output amplifier 26 to amplify and output a signal obtained by averaging pixel signals held in the unit analog memories 34 denoted by reference characters H3M and H4M.

Pixel signals for one line having undergone horizontal 2-pixel addition are read out by sequentially performing such processing. A whole image having undergone horizontal 2-pixel addition is read out by performing the processing for one line for each of all lines.

Note that although a case where the number of pixels to be added is two has been described here, if the general number of pixels to be added is n (n is an integer not less than 2), the number of shift registers, to which SR scan pulses at high level are to be simultaneously applied, may be set to n. Although pixel addition in a horizontal direction has been described here, pixel addition in the vertical direction can also be realized using a same configuration. That is, for example, if 2-pixel addition in the vertical direction is performed, simultaneous selection of two lines to be added causes the output amplifier 26 to amplify and output a signal obtained by averaging pixel signals held in the unit analog memories 34 for two pixels in the vertical direction. Combination of pixel addition in the horizontal direction and pixel addition in the vertical direction allows pixel addition in the horizontal and vertical directions.

Figure 6:
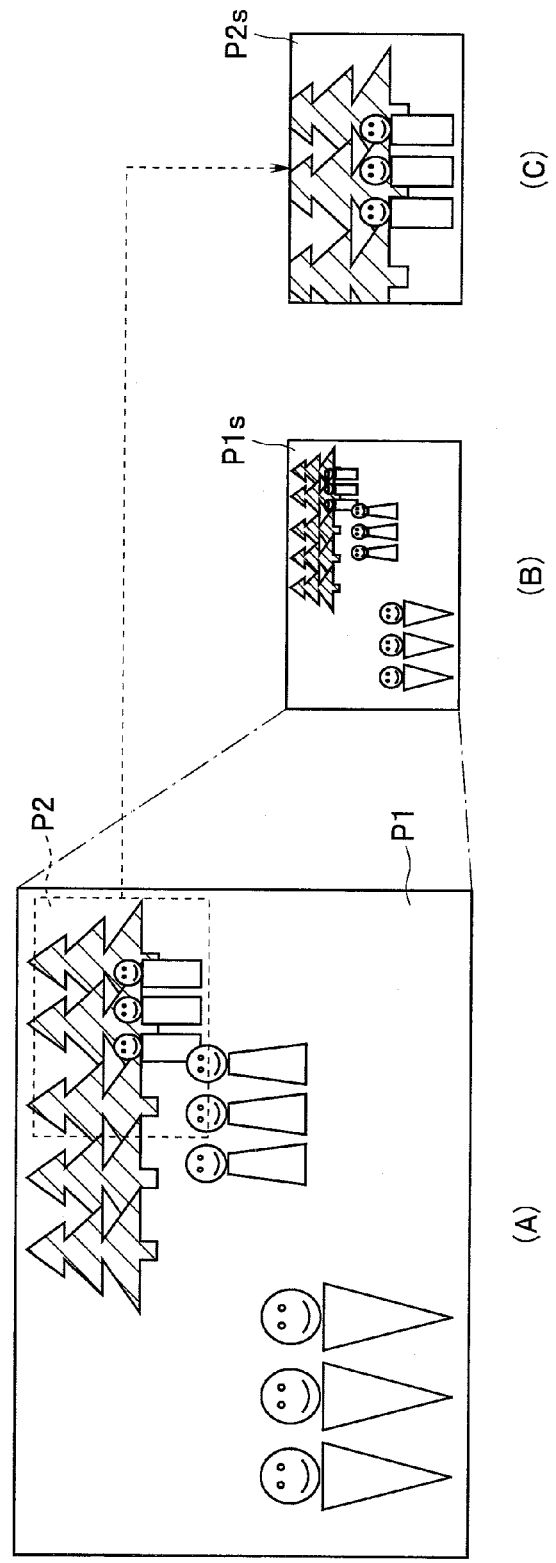
FIG. 6 are views showing examples of a plurality of images having different object region sizes which are nondestructively read out by second readout control, according to the first embodiment.

FIG. 6 are views showing an example of a plurality of images having different object region sizes which are nondestructively read out by the second readout control.

FIG. 6(A) shows an all-pixel image P1 which is generated by the pixel section 21. The all-pixel image P1 is read out from the pixel section 21 and is stored in the frame memory 23.

By performing at least one of pixel addition readout and pixel skipping readout on the all-pixel image P1 with the second readout control section 24 and the third readout control section 25, a whole image P1s of a smaller number of pixels than all pixels, as shown in FIG. 6(B), is outputted from the image pickup device 3.

By extracting and reading out a partial region P2 in the all-pixel image P1 shown in FIG. 6(A), an enlarged image P2s of a smaller number of pixels than all the pixels, as shown in FIG. 6(C), is outputted from the image pickup device 3.

As described above, the number of pixels constituting an identical object portion is larger in the enlarged image shown in FIG. 6(C) than in the whole image shown in FIG. 6(B), and the enlarged image has higher definition.

Note that the whole image P1s and the enlarged image P2s outputted from the image pickup device 3 may be identical or different in the number of pixels. The number of pixels required when live view is in operation depends on the number of display pixels on the display section 11. For example, if the display section 11 is an SVGA display, the whole image P1s is set to SVGA, and the enlarged image P2s is set to SVGA to VGA. This is because the whole image P1s is often displayed over a whole of a screen of the display section 11, and the enlarged image P2s may be displayed over the whole of the screen or in a portion of the screen (see also FIG. 7 to be described below).

Figure 7:
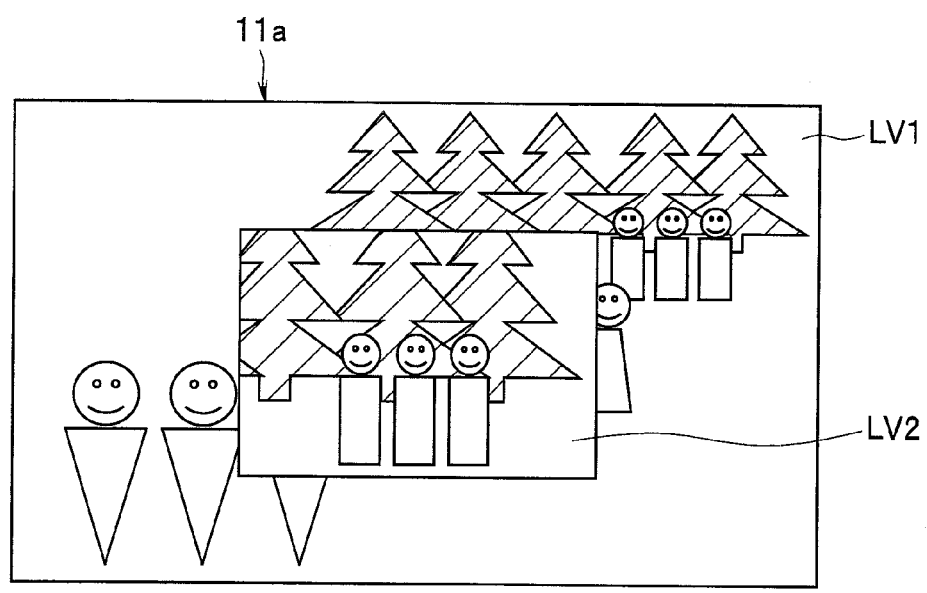
FIG. 7 is a view showing a live view display example of a whole image and an enlarged image which are read out from the image pickup device, according to the first embodiment.

FIG. 7 is a view showing a live view display example of a whole image and an enlarged image which are read out from the image pickup device.

In the example shown in FIG. 7, full-region live view LV1 based on the whole image P1s is performed all over a screen 11a of the display section 11, and enlarged region live view LV2 based on the enlarged image P2s is performed in a smaller display region so as to be superimposed on the full-region live view LV1.

Note that the partial region P2 in the all-pixel image P1 is extracted and read out in the example shown in FIG. 6(C). However, if region size of an enlarged image desired to be displayed is larger, the number of pixels outputted from the image pickup device 3 may be reduced by performing, in combination, extraction readout and at least one of pixel addition readout and pixel skipping readout.

Figure 8:
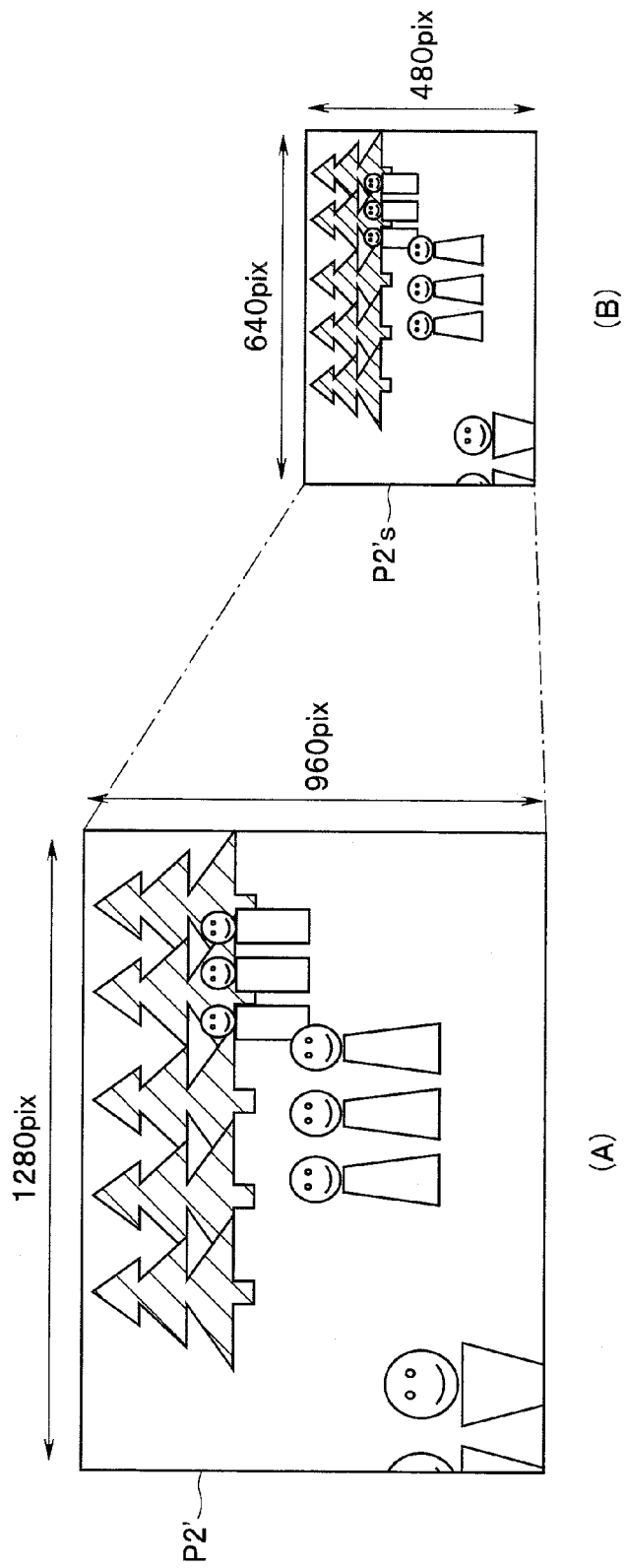
FIG. 8 are views showing an example in which a partial region P2' that is extracted from an all-pixel image P1 is subjected to pixel number conversion, according to the first embodiment.

FIG. 8 are views showing an example in which a partial region P2' extracted from the all-pixel image P1 is subjected to pixel number conversion.

Figure 9:
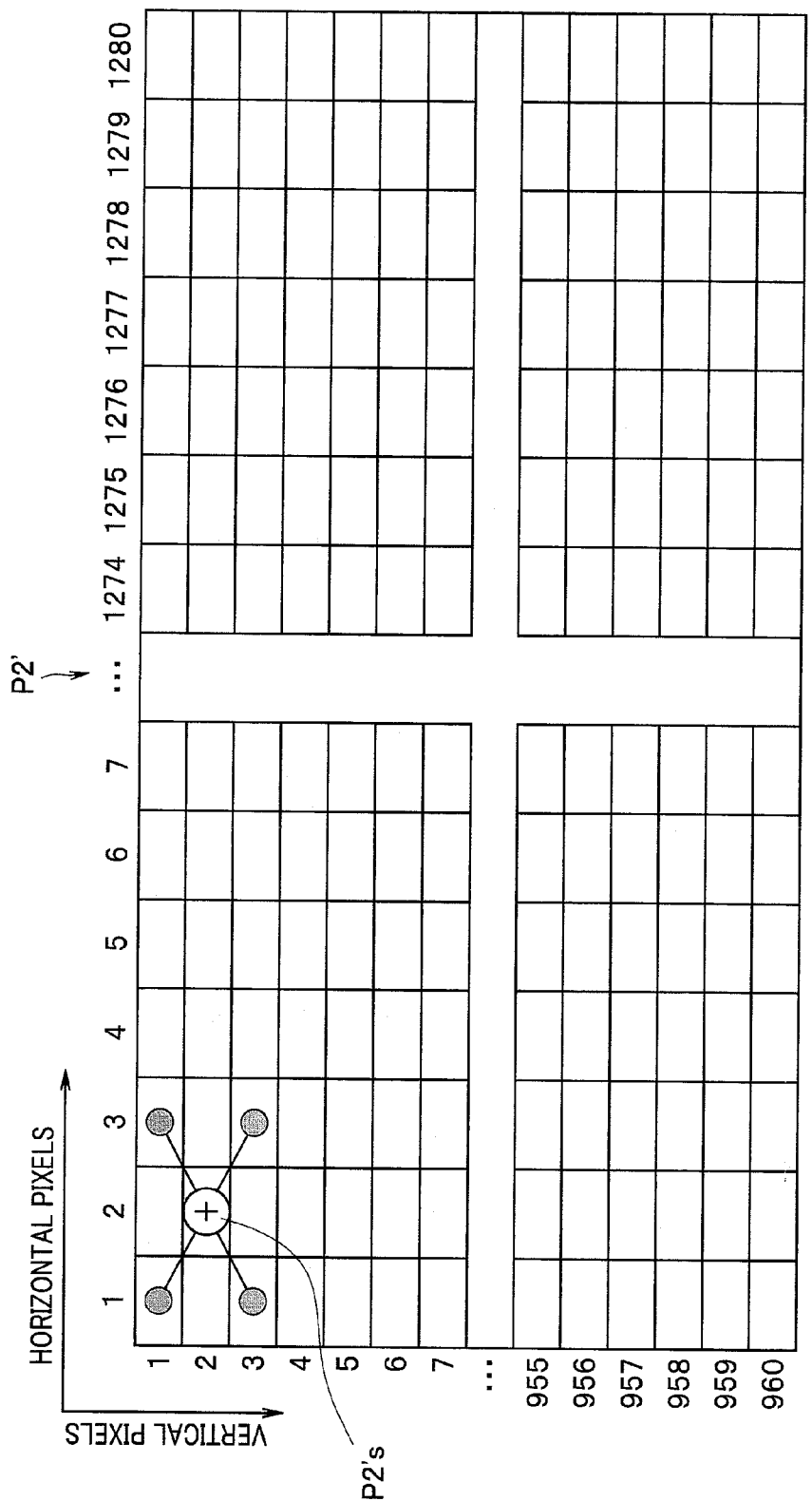
FIG. 9 is a view for explaining a process of performing pixel number conversion by horizontal 2-pixel addition and vertical 2-pixel addition to reduce the number of pixels to one-fourth, according to the first embodiment.

For example, if 640×480 pixels are enough as size of an image outputted for performing the enlarged region live view LV2, and image size of the partial region P2' desired to be extracted from the all-pixel image P1 is 1280×960 pixels, as shown in FIG. 8(A), pixel addition or pixel skipping is performed. FIG. 9 is a view for explaining a process of performing pixel number conversion by horizontal 2-pixel addition and vertical 2-pixel addition to reduce the number of pixels to one-fourth. For example, the pixel number conversion process shown in FIG. 9 is performed, an enlarged image P2's, the number of pixels of which has been reduced to one-fourth, as shown in FIG. 8(B), is generated, and the enlarged image P2's is then outputted from the image pickup device 3. Note that FIG. 9 shows an example of addition of 2×2 pixels of same color in the case of a Bayer-array single-plate image pickup device.

Since the number of pixels to be processed in the ADC 6 can be reduced by performing such processing, further reduction in power consumption can be achieved.

Figure 10:
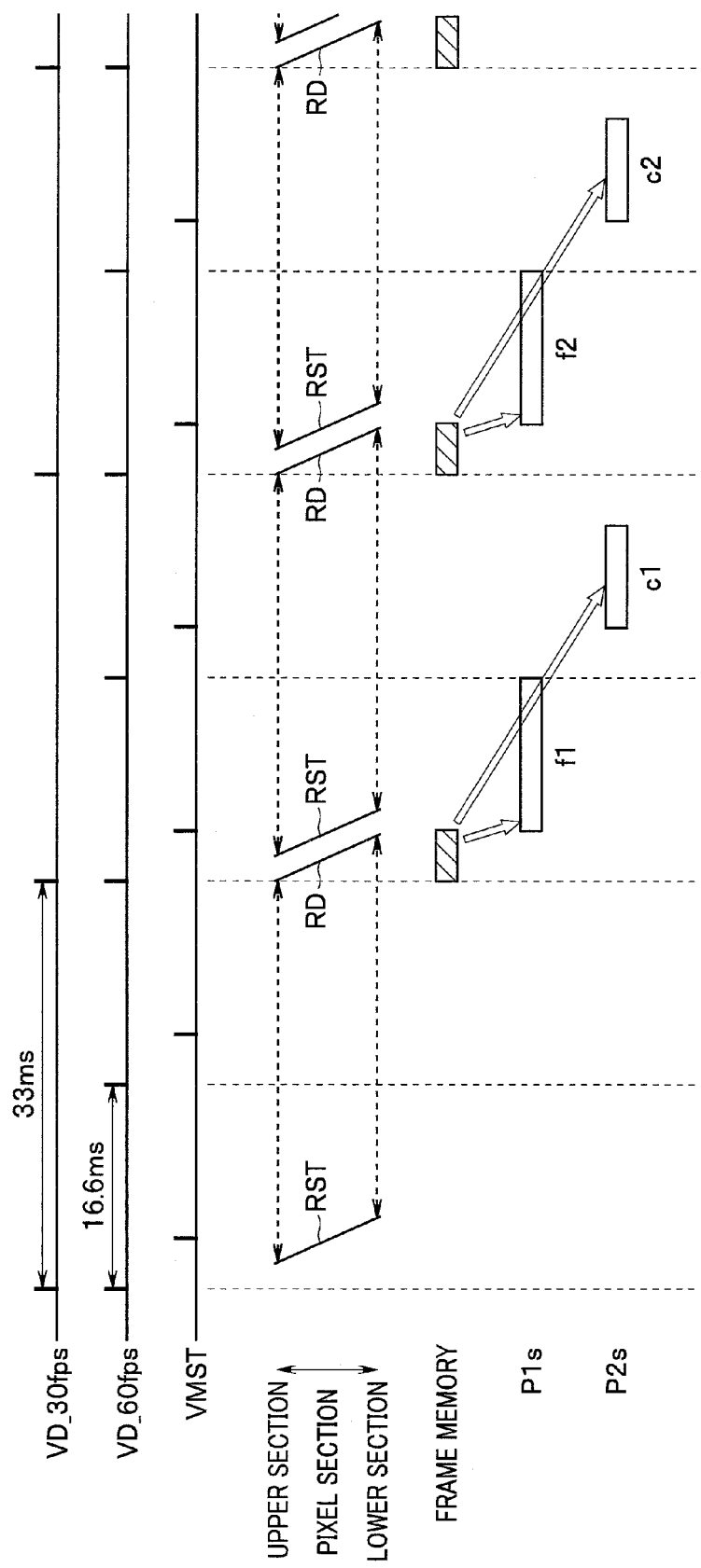
FIG. 10 is a timing chart showing processing in the image pickup device when a plurality of images having different object region sizes are outputted, according to the first embodiment.

FIG. 10 is a timing chart showing processing in the image pickup device 3 when a plurality of images having different object region sizes are outputted.

In the example shown in FIG. 10, a vertical synchronizing signal VD_30 fps to be applied to the first readout control section 22 is a 30 fps signal with a period of 33 ms, and a vertical synchronizing signal VD_60 fps to be applied to the second readout control section 24 is a 60 fps signal with a period of 16.6 ms. Memory scan pulses VMST also constitute a 60 fps signal with a period of 16.6 ms, though the signal is out of phase with the vertical synchronizing signal VD_60 fps.

The pixel section 21 sequentially resets the unit pixels 31 on a line-by-line basis, e.g., at a reset time RST which is earlier by a predetermined exposure time period than a line-by-line image readout time RD.

When a pulse of the vertical synchronizing signal VD_30 fps is inputted after a lapse of the predetermined exposure time period (note that a pulse of the vertical synchronizing signal VD_60 fps is also inputted simultaneously with the input of the pulse), the first readout control section 22 and the third readout control section 25 cause pixel signals at the unit pixels 31 to be sequentially outputted from the pixel section 21 and be stored in the frame memory 23 on a line-by-line basis.

Since pixels are stored in the frame memory 23 in an analog manner, pixel signals can be transferred at high speed. Additionally, since readout from the pixel section 21 to the frame memory 23 is performed through parallel processing using the plurality of column signal lines 32, as described above, higher-speed transfer is possible. In contrast to a conventional image pickup device requiring time for pixel-by-pixel analog-to-digital conversion and having a low-speed device shutter, the configuration of the present embodiment allows realization of a high-speed device shutter.

When an all-pixel image is stored in the frame memory 23, the second readout control section 24 and the third readout control section 25 first read out, for example, the whole image P1s (whole images for respective frames are denoted by reference characters f1 and f2 in FIG. 10) of a smaller number of pixels than all pixels at a time when a memory scan pulse VMST is inputted. The readout of the whole image P1s is nondestructive readout involving at least one of pixel addition and pixel skipping, as described above.

When the readout of the whole image P1s ends, and a next memory scan pulse VMST is inputted, the second readout control section 24 and the third readout control section 25 read out the enlarged image P2s (respective enlarged images denoted by reference characters c1 and c2 in FIG. 10) of a smaller number of pixels than all the pixels. The readout of the enlarged image P2s is nondestructive readout that performs at least extraction readout, as described above.

Such processing is repeated each time image pickup is performed by the pixel section 21. The readout control section is thus intended to perform the first readout control at predetermined intervals and perform a plurality of nondestructive readout operations in the second readout control in a predetermined order based on object region size within each of the predetermined intervals.

Figure 11:
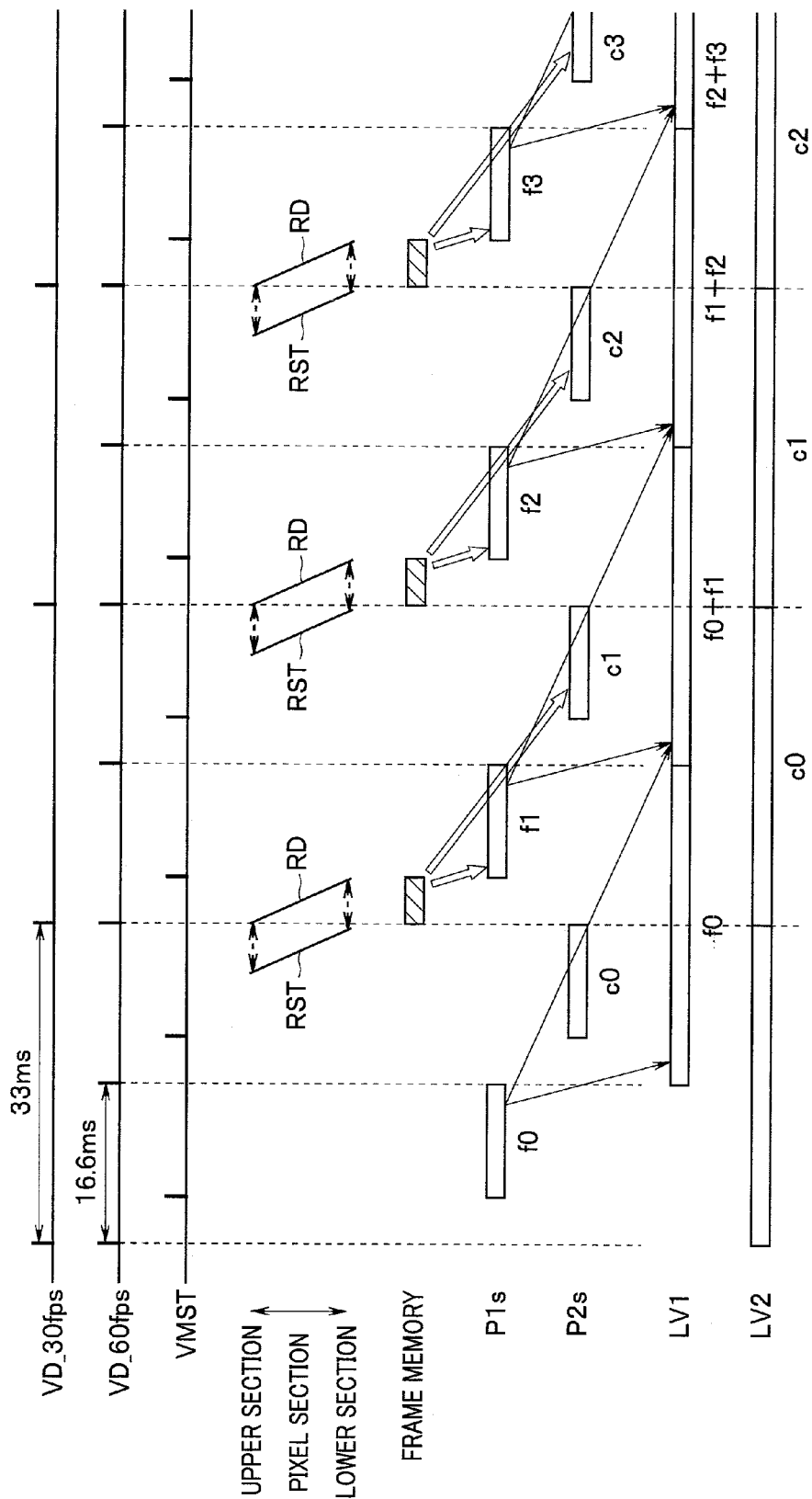
FIG. 11 is a timing chart showing processing in the image pickup device and a display example when a plurality of images having different object region sizes are outputted, according to the first embodiment.

FIG. 11 is a timing chart showing processing in the image pickup device 3 and a display example when a plurality of images having different object region sizes are outputted.

In the example shown in FIG. 11, an exposure time period in the pixel section 21 is shorter than in the example shown in FIG. 10. In the case, an outputted image may be darker than in the example shown in FIG. 10. Although luminance level of an image may be improved by the pixel addition described above, luminance may be insufficient even after the pixel addition. The image processing section 9 performs image addition processing here such that a brighter image can be obtained even in such a case. That is, the image processing section 9 adds images for two frames (f0+f1, f1+f2, . . . ) as the whole image P1s and outputs a resultant image such that the image is displayed for the full-region live view LV1 on the display section 11. Note that, in the case, display update times for the full-region live view LV1 are inconsistent with display update times for the enlarged region live view LV2, as shown in FIG. 11.

Note that since display inconsistency in the whole image P1s caused by a difference (33 ms that is the period of the vertical synchronizing signal VD_30 fps as in the example of FIG. 11) in exposure time between two continuous frames is considered relatively small (because an angle of view is wide, and each object is displayed in a small size), images are added only for the full-region live view LV1 in the example shown in FIG. 11. If an object is stationary or moves only slightly, if hand shake is considered small (hand shake may be detected, and a result of the detection may be referred to), or in other cases, images may be added for the enlarged region live view LV2. The number of frames to be added is, of course, not limited to two.

According to the first embodiment described above, since an image pickup mode need not be changed when a plurality of images having different object region sizes are obtained, a smooth movie can be obtained without causing discontinuity.

Since image data of a smaller number of pixels than all pixels is used as image data to be outputted from the image pickup device when live view is in operation, frequency of a readout clock of the image pickup device 3, an operation clock of the ADC 6, or the like need not be increased, and power consumption can be reduced. Since there is no need to read out all of the pixels at high speed, readout circuits, ADCs, and the like corresponding to a plurality of channels are unnecessary, reduction in circuit scale can be achieved.

Since image data generated in the pixel section 21 is first transferred to the frame memory 23 in an analog manner, there is no need to wait for pixel-by-pixel conversion into a digital signal, a high-speed device shutter can be realized, and rolling shutter distortion can be made small. The analog transfer to the frame memory 23 is performed on a plurality of pixels (more specifically, pixels in all columns which are placed on one line) simultaneously in one operation and in parallel. For the reason, higher-speed transfer can be performed, and a higher-speed shutter can be realized.

Since readout of image data from the image pickup device 3 is performed not from the pixel section 21 but from the frame memory 23, readout of images different in object region size and the number of pixels can be easily performed. Additionally, since readout of image data from the frame memory 23 is nondestructively performed, a plurality of images having different object region sizes at an identical exposure time point can be obtained.

The first readout control is performed at the predetermined intervals, and a plurality of nondestructive readout operations in the second readout control are performed in the predetermined order based on object region size within each of the predetermined intervals. The feature eases control of the image pickup device 3 and image processing in the image processing section 9 and, by extension, allows simplification of the configuration.

Since the number of pixels constituting an identical object portion is larger in enlarged image data than in whole image data, display of a whole image and an enlarged image having different object region sizes on the image display section allows easily performing precise focusing on a main object and checking of brightness using the enlarged image while checking composition using the whole image.

Pixel addition in the image pickup device 3 can make the number of pixels to be outputted from the image pickup device 3 smaller than pixel addition after conversion into digital data by the ADC 6 and obtain the above-described effects. Additionally, since images before being affected by noise in the amplifying circuit 4 and the ADC 6 can be added, a high-quality image can be obtained with lower noise and analog-specific speediness. Since an image to be obtained is an added image, reduction in dark noise can, of course, be achieved.

Second Embodiment

Figure 12:
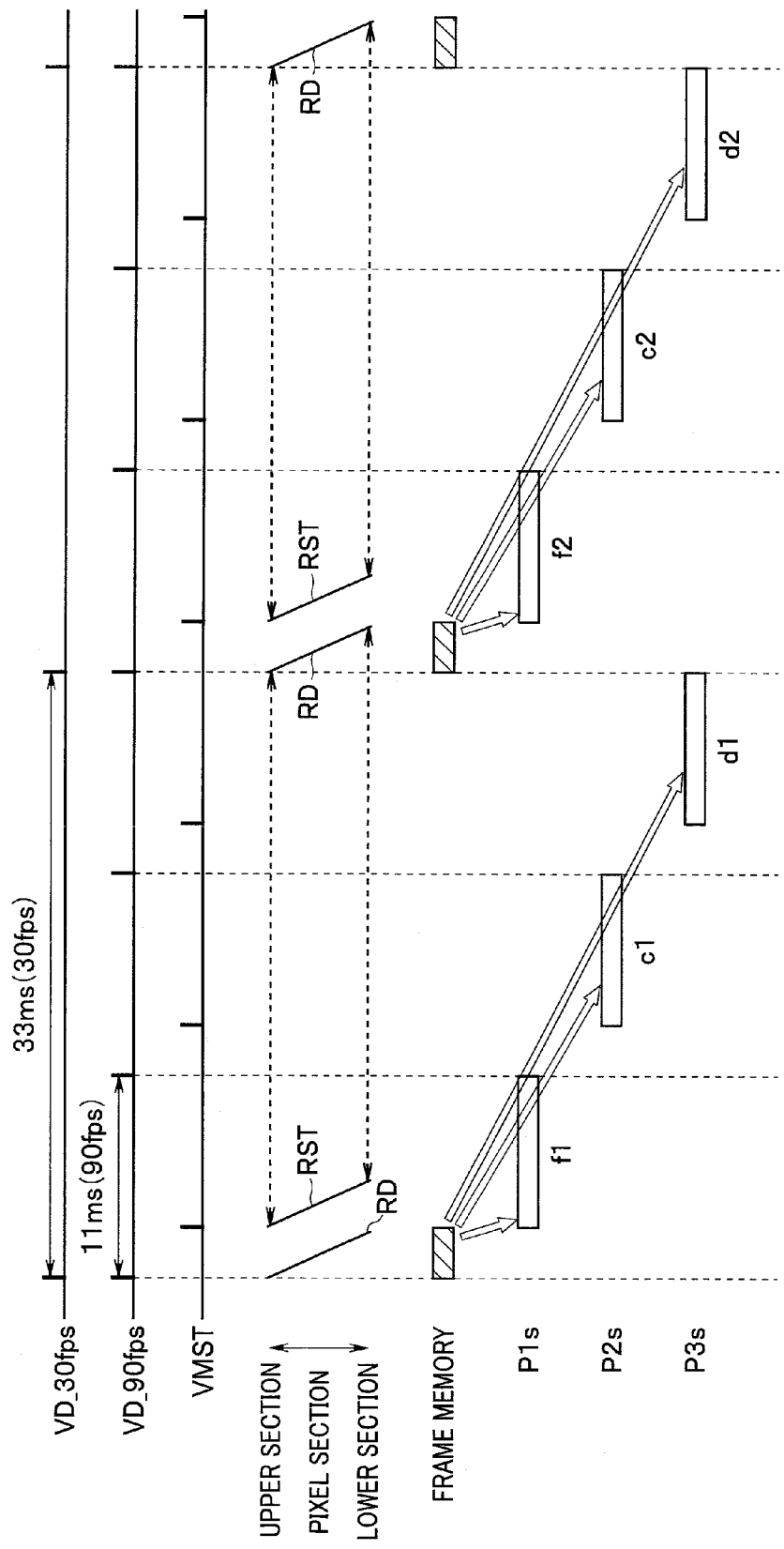
FIG. 12 is a timing chart showing processing in an image pickup device when a plurality of images having different object region sizes are outputted, according to a second embodiment.
Figure 13:
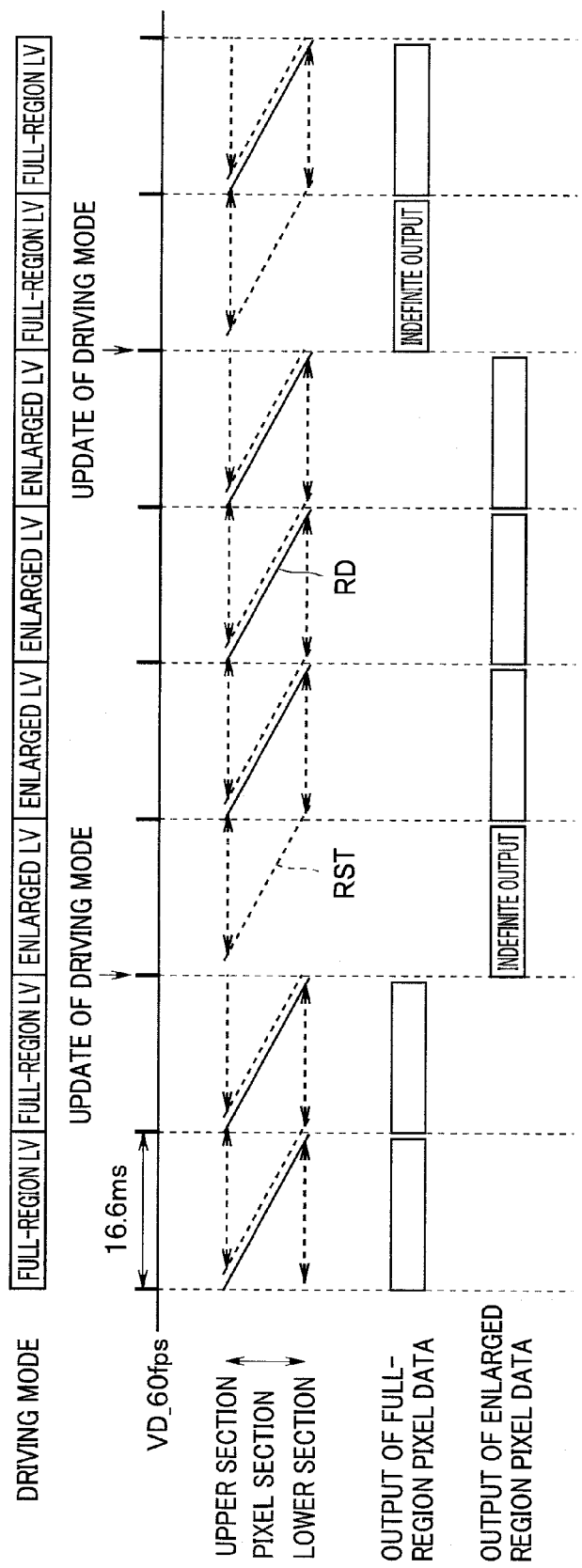
FIG. 13 is a timing chart showing a first conventional technique which changes a driving mode of an image pickup device at constant intervals.
Figure 14:
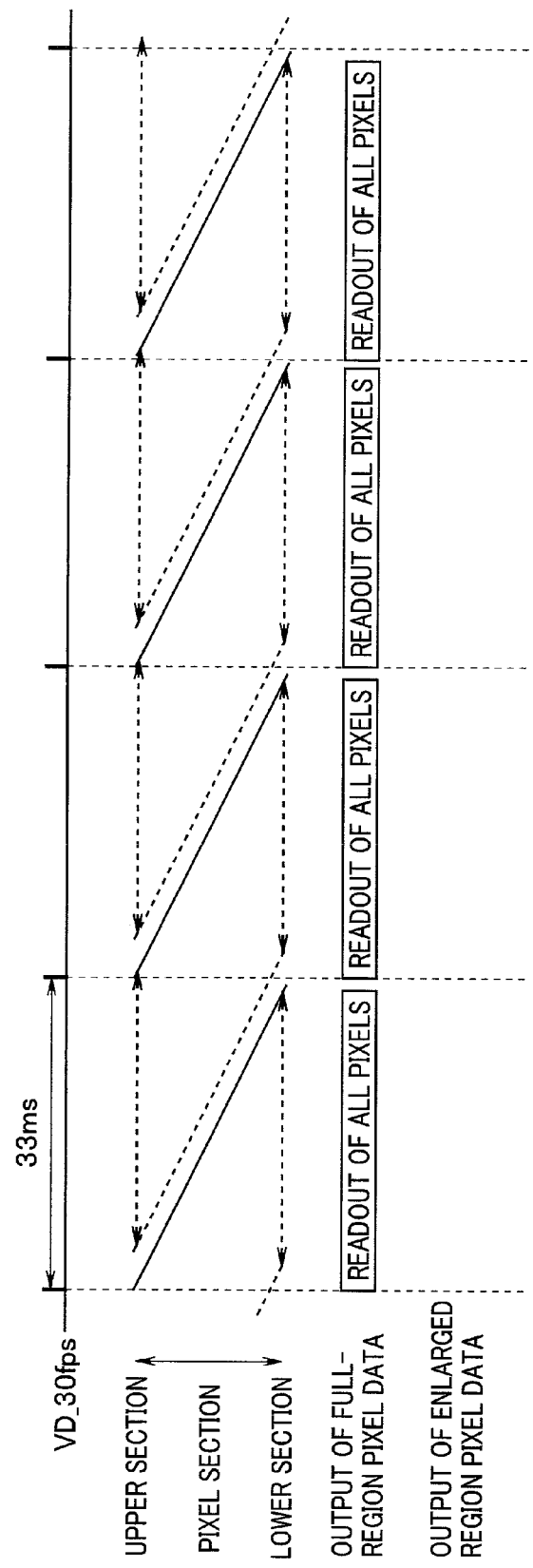
FIG. 14 is a timing chart showing a second conventional technique which reads out all pixels at high speed.

FIG. 12 shows a second embodiment of the present invention and is a timing chart showing processing in an image pickup device 3 when a plurality of images having different object region sizes are outputted.

In the second embodiment, same portions as the portions of the first embodiment described above are denoted by same reference numerals, and a description of the portions will be omitted. Only differences will be primarily described.

In the first embodiment described above, two pieces of image data having different object region sizes are outputted from the image pickup device 3. In contrast, in the second embodiment, three pieces of image data having different object region sizes are outputted from the image pickup device 3.

That is, in the example shown in FIG. 12 according to the present embodiment, a vertical synchronizing signal VD_30 fps to be applied to a first readout control section 22 is a 30 fps signal with a period of 33 ms, like the first embodiment described above, but a vertical synchronizing signal VD_90 fps to be applied to a second readout control section 24 is a 90 fps signal with a period of 11 ms. Memory scan pulses VMST also constitute a 90 fps signal with a period of 11 ms, though the signal is out of phase with the vertical synchronizing signal VD_90 fps.

When a pulse of the vertical synchronizing signal VD_30 fps is inputted after a lapse of a predetermined exposure time period (note that a pulse of the vertical synchronizing signal VD_90 fps is also inputted simultaneously with the input of the pulse), the first readout control section 22 and a third readout control section 25 cause pixel signals to be read out from a pixel section 21, and be stored in a frame memory 23 e.g., on a line-by-line basis at image readout times RD.

When an all-pixel image is stored in the frame memory 23, the second readout control section 24 and the third readout control section 25 first nondestructively read out, for example, a whole image P1s (denoted by reference characters f1 and f2 in FIG. 12) of a smaller number of pixels than all pixels at a time when a memory scan pulse VMST is inputted, like the first embodiment.

When the readout of the whole image P1s ends, and a next memory scan pulse VMST is inputted, the second readout control section 24 and the third readout control section 25 read out an enlarged image P2s (denoted by reference characters c1 and c2 in FIG. 12) of a smaller number of pixels than all the pixels.

When the readout of the enlarged image P2s ends, and a next memory scan pulse VMST is inputted, the second readout control section 24 and the third readout control section 25 read out an enlarged image P3s (denoted by reference characters d1 and d2 in FIG. 12) of a smaller number of pixels than all the pixels and different in object region size from the enlarged image P2s.

Such processing is repeated each time image pickup is performed by the pixel section 21.

Note that although pieces of image data having two object region sizes are outputted from the image pickup device 3 in the first embodiment described above, and pieces of image data having three object region sizes are outputted from the image pickup device 3 in the present embodiment, pieces of image data having four or more object region sizes may, of course, be outputted.

In what order pieces of image data having a plurality of object region sizes are read out may be appropriately determined, as needed. Note that since changing a readout order for each image pickup operation makes processing complicated, it is desirable that once the readout order is determined, readout in the order is repeated.

According to the second embodiment, in a case where pieces of image data having three object region sizes are outputted from the image pickup device 3, substantially same effects as the effects of the first embodiment described above can be produced.

Note that although an image pickup apparatus has been primarily described above, the present invention is not limited to an image pickup apparatus. The present invention may be applied to an image pickup method, an image pickup processing program, a computer-readable recording medium having an image pickup processing program recorded thereon, or the like.

Note that the present invention is not limited to the above-described embodiments as they are, and in an implementation phase, constituent elements can be modified and embodied without departing from the gist of the present invention. Various inventions can be formed by appropriately combing a plurality of constituent elements disclosed in the embodiments above. For example, some of all constituent elements disclosed in the embodiments may be omitted. Alternatively, constituent elements according to different embodiments may be appropriately combined. It is, of course, possible to make various modifications and applications without departing from the scope of the invention.

What is claimed is:
1. An image pickup apparatus comprising:
an image pickup device having a pixel section with a plurality of two-dimensionally arranged pixels and a frame memory which temporarily stores, in an analog manner, analog image data of all pixels read out from the pixel section;
a first readout control section which performs first readout control of reading out image data of all pixels obtained through one exposure from the pixel section and storing the image data in the frame memory; and
a second readout control section which performs second readout control of nondestructively reading out a piece of image data of a smaller number of pixels than all the pixels from the image data of all the pixels stored in the frame memory a plurality of times such that the piece of image data each have a different object region size,
wherein
the plurality of pieces of image data having the different object region sizes in the second readout control include whole image data having a first object region identical to an object region of the image data composed of all the pixels and enlarged image data having a second object region smaller than the object region of the image data composed of all the pixels, and
the second readout control section, in nondestructive readout of the second readout control, performs at least one of pixel addition readout and pixel skipping readout when the whole image data is read out, and makes a number of pixels of the enlarged image data constituting the second object region larger than a number of pixels of image data constituting the second object region in the whole image data by performing at least extraction readout when the enlarged image data is read out.

2. The image pickup apparatus according to claim 1, wherein the first readout control section performs the first readout control at predetermined intervals and the second readout control section performs a plurality of nondestructive readout operations in the second readout control in a predetermined order based on object region size within each of the predetermined intervals.

3. The image pickup apparatus according to claim 1, wherein the first readout control section reads out a plurality of pixels from the pixel section to the frame memory simultaneously in one operation and in parallel, in the first readout control.

4. The image pickup apparatus according to claim 1, further comprising an image display section which displays the plurality of pieces of image data having the different object region sizes read out from the image pickup device under control of the second readout control section.

5. An image pickup method for reading out image data from an image pickup device having a pixel section with a plurality of two-dimensionally arranged pixels and a frame memory which temporarily stores, in an analog manner, analog image data of all pixels read out from the pixel section, the method comprising:

a first step of performing first readout control of reading out image data of all pixels obtained through one exposure from the pixel section and storing the image data in the frame memory; and a second step of performing second readout control of nondestructively reading out a piece of image data of a smaller number of pixels than all the pixels from the image data of all the pixels stored in the frame memory a plurality of times such that the piece of image data each has different object region size, wherein the plurality of pieces of image data having the different object region sizes in the second readout control include whole image data having a first object region identical to an object region of the image data composed of all the pixels and enlarged image data having a second object region smaller than the object region of the image data composed of all the pixels, and wherein the second step comprises, in nondestructive readout of the second readout control, performing at least one of pixel addition readout and pixel skipping readout when the whole image data is read out, and making a number of pixels of the enlarged image data constituting the second object region larger than a number of pixels of image data constituting the second object region in the whole image data by performing at least extraction readout when the enlarged image data is read out.

\* \* \* \* \*